United States Patent Office 3,697,298
Patented Oct. 10, 1972

3,697,298
AIR DRYING POLY(VINYLIDENE FLUORIDE) COATINGS
Martin R. Hastings, Pittsburgh, and Glenn W. Luckock, Natrona Heights, Pa., assignors to PPG Industries, Inc., Pittsburgh, Pa.
No Drawing. Filed Sept. 30, 1969, Ser. No. 862,505
Int. Cl. B23p 7/00; B32b 27/30
U.S. Cl. 117—2 R                13 Claims

ABSTRACT OF THE DISCLOSURE

A method of applying continuous coatings comprising poly(vinylidene fluoride) without baking at high temperatures comprises applying on a substrate a thin layer of a composition comprising poly(vinylidene fluoride) and certain organic liquids, the liquids usable being those having a boiling point between about 125 and about 250° C. in which poly(vinylidene fluoride) forms a substantially clear solution in concentrations of at least 10 percent by weight. The method can be used to "touch-up" or repair baked poly(vinylidene fluoride) coatings, or for the application of continuous protective coatings on a substrate.

BACKGROUND OF THE INVENTION

Coatings from compositions in which poly(vinylidene fluoride) is the chief film-forming resin in the vehicle have been found to provide excellent properties, and especially a high level of durability and resistance to weathering and corrosive elements. Because of these properties, such coatings have become of widespread interest in a variety of industrial uses.

Limiting the utilization of these coatings, however, has been several disadvantages, these being based primarily upon the necessity for baking the poly(vinylidene fluoride) coatings known heretofore at very high temperatures, i.e. temperatures generally in excess of 450° F. These high temperatures are required because the usual coating compositions containing poly(vinylidene fluoride) employ the resin as a dispersion in a latent solvent for the resin. Thus, the high temperatures required are necessary in order to fuse the discrete particles of poly(vinylidene fluoride) into a continuous impervious coating, as is required for adequate coating performance. Even where apparent solutions of poly(vinylidene fluoride) in a solvent or solvent mixture have been described, it has been noted that in appreciable concentrations the poly(vinylidene fluoride) does not form an actual true solution, with the resin particles being in a solvated or colloidal state. Thus, it has been considered that high fusion temperatures are essential requirements for the obtention of suitable poly(vinylidene fluoride) coatings.

The apparent need for such high baking temperatures has limited the substrates to which the poly(vinylidene fluoride) can be applied. Many substrates, notably wood, plastics and the like, will not withstand such high temperatures; metal surfaces, especially in end sections, are also deleteriously affected by subjection to very high baking temperatures. Furthermore, the need for obtaining these temperatures results in greatly increased processing and equipment costs, and in many cases makes it impractical to apply these coatings to various shaped articles. Still another disadvantage of poly(vinylidene fluoride) coatings is that imperfections in the finished coating, which may result from improper applicacation or damage during handling, are difficult to touch-up or repair without resorting to high temperatures; such temperatures degrade the remainder of the coating and cannot be attained except using special equipment which is not generally available to the user.

A coating based on poly(vinylidene fluoride) which can be applied at relatively low temperatures, i.e. below about 200° F. and preferably at room temperature, is therefore needed in order to permit the realization of the advantages of these coatings for many purposes.

SUMMARY OF THE INVENTION

It has now been discovered that appreciably high concentrations of poly(vinylidene fluoride) are compatible with and from clear solutions with certain solvents, and that these solutions, when applied to a substrate, dry at relatively low temperatures, including room temperature, to form continuous films having the highly desirable properties characteristic of poly(vinylidene fluoride) coatings as known in the art. The solvents usable in this manner are organic liquids having a boiling point between about 12° C. and about 250° C. and in which poly(vinylidene fluoride), in concentrations of at least about 10 percent by weight, forms substantially clear solutions. By a "solution" as the term is used herein is meant either true or apparent solutions, in which the resin is no longer visible as discrete particles under ordinary conditions and which are substantially clear under these condtions and in the concentrations specified.

Compositions containing poly(vinylidene fluoride) and these organic liquids can be used to provide clear or pigmented coating compositions which are applied to substrates of varying types in thin layers and then dried at temperatures below about 200° F. to provide continuous coatings and films of desirable properties. In most cases, drying at room temperatures provides desirable coatings.

DETAILED DESCRIPTION OF THE INVENTION

The method of the present invention comprises the steps of coating a substrate with a thin layer of a coating composition in which the vehicle comprises poly(vinylidene fluoride) and an organic liquid in which at least about 10 percent by weight of poly(vinylidene fluoride) forms a substantially clear solution, and then drying the layer on the substrate at a temperature below about 200° F. The liquid solvent used should have a boiling point between about 125° C. and about 250° C., and should be volatile at room temperature; by "volatile" being meant having a sufficient high vapor pressure at room temperature to permit drying within a reasonable time (e.g., 24 to 48 hours). Liquids of the described boiling points are found to be volatile.

Exemplifyinng the type of solvents which can be utilized herein are liquid organic amides, phosphates, pyrrolidones and lactones having boiling points within the range mentioned. Among these organic liquids are N,N-di(lower alkyl)formamide, N,N-di(lower alkyl)acetamides, tri(lower alkyl)phosphates, N-(lower alkyl)-2-pyrrolidones, and gamma-lactones having up to about 6 carbon atoms in the ring. Specific materials which are preferably utilized include N,N-dimethylformamide, N,N-dimethylacetamide, N-methyl - 2 - pyrrolidone, gamma-butyrolactone, gamma-valerolactone, trimethylphosphate and triethylphosphate.

The above solvents are exemplary of the general class to which the invention herein pertains, i.e. organic liquids having the described boiling point range and which form compatible, substantially clear solutions with poly(vinylidene flouride). The basis for the invention is the discovery that organic liquids having such properties when combined with poly(vinylidene fluoride) form continuous coatings at low temperatures, and thus the invention is not limited to the specific solvents mentioned. It will be apparent that various other solvents of the general class described can be utilized with equivalent results.

However, a number of organic liquid solvents and solvent classes are not generally utilizable in the invention herein since they do not have the above described properties. Among these, for example, are aliphatic and aromatic hydrocarbons and most ketones, esters and ethers. It is relatively easy to ascertain the suitability of any particular solvent or solvent mixture and it will be understood that various mixtures which can be used may include liquids which cannot be utilized alone.

In addition to the poly(vinylidene fluoride) and the organic liquid as described, the coating compositions employed in the practice of the invention may contain various other components. For instance, they may contain, as desired, one or more pigments of the type generally utilized in poly(vinylidene fluoride) compositions. Also, other resinous components can be included so long as the poly(vinylidene fluoride) provides the major resinous component of the vehicle; preferably poly(vinylidene fluoride) comprises at least about 80 percent by weight of the total resinous materials present. Acrylic resins, such as acrylate polymers, are in many cases utilized along with poly(vinylidene fluoride) resins (see, for example, U.S. 3,324,069; such combinations are also useful in the method as described in the present invention. Polymers and copolymers of alkyl acrylates such as ethyl acrylate, butyl acrylate, 2-ethylhexyl acrylate and the like, and alkyl methacrylates, such as methyl methacrylate, butyl methacrylate, lauryl methacrylate, etc., are among the acrylic polymers employed in this manner.

The method of the invention is applicable to the coating of virtually any substrate, including aluminum, steel, zinc, copper and other metals, as well as wood, paper, glass, plastics etc. As indicated, one of the uses of the invention is a method for repairing previously coated surfaces, especially those coated with poly(vinylidene fluoride) finishes. Thus, coated surfaces of various types are also among the substrates to which the invention is applicable.

In carrying out the method of the invention, the coating composition is applied as a thin layer to the substrate. By a "thin layer" is meant the type of coatings which are applied by conventional painting methods and which can vary in wet film thickness from about 0.5 ml or less to about 20 mils or higher. Essentially any application method can be used, including brushing, roll coating, flow coating, spraying, etc.

After the composition has been applied to the substrate, it is dried to form the finished coating. The drying can be carried out at ordinary ambient temperatures, i.e. room temperature, which is generally considered to be about 70 to 80° F., but somewhat faster drying speeds can be obtained by force drying the coating at temperatures of up to about 200° F. Drying can also be aided by removal of the solvent vapors, as by exhaust fans or the like.

The invention will be described further in connection with the examples which follow. These examples are not to be construed as limiting the invention but only as illustrations thereof. All parts and percentages in the examples as well as throughout the specification are by weight and are based on non-volatile solids content unless otherwise indicated.

In the examples, the poly(vinylidene fluoride) employed was a commerically available polymer, known as "Kynar 500," having the following properties:

Melting point (crystalline) _____° F__ 340
Specific gravity _____ 1.76
Refractive index ($n_D^{25}$) _____ 1.42
Tensile strength (77° F.) _____p.s.i__ 7000

In certain of the examples, a small proportion of an acrylic copolymer is utilized; the copolymer employed was a commercial acrylic polymer composed of about 70 percent methyl methacrylate and about 30 percent acrylate.

EXAMPLES 1–7

Coatings were produced from poly(vinylidene fluoride) by using various solvents in accordance with the invention by adding poly(vinylidene fluoride) and, in some cases an acrylic copolymer and pigment, to 80 parts of the solvent. Each of the compositions was then applied as a 2 to 5 mil film onto aluminum sheet and air dried at room temperature. Smooth, continuous adherent coatings were obtained which were dry to the touch in about one hour and which, after air drying for 17 to 24 hours, were found to have excellent overall properties including good solvent resistance, durability, etc. Table I below gives the various compositions employed in this manner.

TABLE I
[Examples 1–7]

| Example | Solvent | Poly(vinylidene fluoride) (parts) | Acrylic copolymer (parts) | TiO$_2$ pigment (parts) |
| --- | --- | --- | --- | --- |
| 1 | N,N-dimethylacetamide | 20 | | |
| 2 | N,N-dimethylformamide | 17 | 3 | 6 |
| 3 | 2-pyrrolidone | 10 | | |
| 4 | N-methyl-2-pyrrolidone | 17 | 3 | |
| 5 | Trimethyl phosphate | 10 | 1.5 | 3 |
| 6 | Triethyl phosphate | 17 | 3 | |
| 7 | Gamma-butyrolactone | 17 | 3 | 6 |

As discussed above, the solvents which are employed in the present invention can be used as blends with other solvents, which by themselves are not suitable, to provide air-drying coatings as described. The examples below illustrate this embodiment of the invention.

EXAMPLE 8

A mixture of 17 parts of poly(vinylidene fluoride) and 3 parts of the acrylic copolymer employed in the above examples was dissolved in 80 parts of a solvent blend containing 48 parts of N,N-dimethylacetamide and 32 parts of diisobutyl ketone. The composition was pigmented with 6 parts of titanium dioxide pigment, applied as a 4 mil film to aluminum sheet, and air dried at room temperature. A continuous coating was obtained which was dry to touch in less than one hour. After 24 hours at room temperature, the coating had excellent adhesion, solvent resistance, and durability; for instance, after 1677 hours exposure in a "Weatherometer" the coating retained its excellent film integrity and appearance.

EXAMPLE 9

Example 8 was repeaetd except that the pigment was omitted and the solvent blend contained 48 parts of N,N-dimethylactamide and 32 parts of acetone. A continuous coating of good properties was again obtained.

EXAMPLE 10

Following the procedure of Examples 1 to 7, a composition was produced in which the solvent was a mixture of 40 parts of N,N-dimethylformamide and 40 parts of methyl ethyl ketone. When applied and air-dried at room temperature in the foregoing manner, a coating having properties comparable to those above was obtained.

As described above, the invention is applicable to compositions containing varying concentrations of poly(vinylidene fluoride). Table II below describes a number of compositions in which the concentration of the polymer in the solvent is varied. In each instance, air-drying of films provide continuous smooth coatings of suitable properties.

TABLE II
[Examples 11-20]

| Example | Solvent | Poly(vinylidene fluoride) concentration (percent by weight) |
|---|---|---|
| 11 | N,N-dimethylacetamide | 10 |
| 12 | do | 20 |
| 13 | do | 30 |
| 14 | do | 35 |
| 15 | Trimethyl phosphate | 10 |
| 16 | do | 25 |
| 17 | Butyrolactone | 10 |
| 18 | do | 30 |
| 19 | N-methyl-2-pyrrolidone | 10 |
| 20 | do | 25 |

An important utility of the present invention is in providing a method for the repair or "touching-up" of conventional poly(vinylidene fluoride) coatings which have been cured or fused at elevated temperatures. The following example illustrates this embodiment of the invention.

EXAMPLE 21

A poly(vinylidene fluoride) coating composition containing poly(vinylidene fluoride) as the vehicle resin and titanium dioxide pigment was applied to a steel substrate and baked at 500° F. for 90 seconds. An attractive, adherent continuous coating was obtained, which was then scratched and chipped to provide a damaged surface. The damaged portion of the coating was then repaired by application of the composition described in Example 8 above. After air-drying for 24 hours the repaired coating again had an attractive appearance substantially indistinguishable from the original coating.

Another advantage of the present invention is that it permits the application of poly(vinylidene fluoride) coatings to substrates which cannot otherwise be coated with such materials. The coating of wood in this manner is particularly advantageous and is carried out by the application of compositions such as those described in the foregoing examples on a wood surface, preferably having a sealer or primer applied thereto, and then air-drying in the manner described. In a similar manner, coatings can be applied to other such surfaces including various plastics, paper, etc.

According to the provisions of the patent statues, there are described above the invention and what are now considered to be its best embodiments. However, within the scope of the appended claims, it is to be understood that the invention can be practiced otherwise than as specifically described.

What is claimed is:
1. A method of repairing a damaged poly(vinylidene fluoride) coating fused at elevated temperatures on a substrate which comprises
   (1) applying to the damaged areas of said fused coating a composition in which the vehicle comprises poly(vinylidene fluoride) and an organic liquid having a boiling point between about 125° C. and about 250° C. in which at least about 10 percent by weight of poly(vinylidene fluoride) forms a substantially clear solution, and
   (2) drying the repaired coating at a temperature below about 200° F.
2. The method of claim 1 in which said coating is dried at room temperature.
3. The method of claim 1 in which said liquid comprises N,N-di(lower alkyl)formamide or N,N-di(lower alkyl)acetamide.
4. The method of claim 1 in which said liquid comprises a tri(lower alkyl) phosphate.
5. The method of claim 1 in which said liquid comprises a gamma-lactone having up to about 6 carbon atoms in the ring.
6. The method of claim 1 in which said liquid comprises N-lower alkyl-2-pyrrolidone.
7. The method of claim 1 in which said liquid comprises N,N-dimethylformamide.
8. The method of claim 1 in which said liquid comprises N,N-dimethylacetamide.
9. The method of claim 1 in which said liquid comprises N-methyl-2-pyrrolidone.
10. The method of claim 1 in which said liquid comprises gamma-butyrolactone.
11. The method of claim 1 in which said liquid comprises trimethyl phosphate.
12. The method of claim 1 in which said liquid comprises triethyl phosphate.
13. The method of caim 1 in which said liquid is selected from the group consisting of N,N-di(lower alkyl) formamides, N,N-di(lower alkyl)acetamides, tri(lower alkyl)phosphates, N-lower alkyl-2-pyrrolidones and gamma-lactones having up to about 6 carbon atoms in the ring.

References Cited
UNITED STATES PATENTS

| 2,435,537 | 2/1948 | Ford et al. | 260—92.1 |
| 2,530,738 | 11/1950 | Spessard | 117—64 |
| 3,169,120 | 2/1965 | Capron et al. | 117—132 X |
| 3,320,206 | 5/1967 | Neros | 260—41 |
| 3,449,305 | 6/1969 | Stilmar | 117—148 X |
| 3,451,978 | 6/1969 | Chalmers et al. | 117—148 X |

FOREIGN PATENTS

| 556,755 | 10/1943 | Great Britain | 117—2 |

WILLIAM D. MARTIN, Primary Examiner
T. G. DAVIS, Assistant Examiner

U.S. Cl. X.R.
117—124 E, 138.8 UF, 148, 155